(12) United States Patent
Mullenaux

(10) Patent No.: US 11,427,458 B2
(45) Date of Patent: Aug. 30, 2022

(54) RE-FILLABLE DRINKING CONTAINER FOR USE WITH A WATER-DISPENSING SYSTEM

(71) Applicant: AQUAPHANT, INC., Las Vegas, NV (US)

(72) Inventor: Thomas Mullenaux, San Pedro, CA (US)

(*) Notice: Subject to any disclaimer, the term of this patent is extended or adjusted under 35 U.S.C. 154(b) by 134 days.

(21) Appl. No.: 17/063,771

(22) Filed: Oct. 6, 2020

(65) Prior Publication Data
US 2022/0135391 A1  May 5, 2022

Related U.S. Application Data

(63) Continuation-in-part of application No. 16/827,794, filed on Mar. 24, 2020, now Pat. No. 11,066,286.

(51) Int. Cl.
| | |
|---|---|
| B67D 1/08 | (2006.01) |
| B67D 1/00 | (2006.01) |
| A47C 21/00 | (2006.01) |
| B67D 1/12 | (2006.01) |
| A47G 19/22 | (2006.01) |
| H02J 50/10 | (2016.01) |

(52) U.S. Cl.
CPC ............ B67D 1/0894 (2013.01); A47C 21/00 (2013.01); A47G 19/2205 (2013.01); B67D 1/0014 (2013.01); B67D 1/0888 (2013.01); B67D 1/0895 (2013.01); B67D 1/1277 (2013.01); *B67D 2001/1263* (2013.01); *H02J 50/10* (2016.02)

(58) Field of Classification Search
CPC .... B67D 1/0014; B67D 1/0894; A47C 7/624; A47C 7/72; A47C 21/00
USPC ............................................... 222/192
See application file for complete search history.

(56) References Cited

U.S. PATENT DOCUMENTS

| | | | | |
|---|---|---|---|---|
| 3,120,404 A | * | 2/1964 | Bramming | A45F 3/46 297/118 |
| 3,560,047 A | * | 2/1971 | Davis | A47C 7/626 297/252 |
| 3,745,596 A | | 7/1973 | Copeland | |
| 4,196,081 A | * | 4/1980 | Pavia | C02F 1/28 210/94 |
| 4,420,097 A | * | 12/1983 | Motsenbocker | A45F 3/16 222/215 |
| 4,533,050 A | * | 8/1985 | Bake, Jr. | F25D 3/08 206/217 |
| D293,393 S | * | 12/1987 | Bothun | D6/358 |

(Continued)

FOREIGN PATENT DOCUMENTS

| | | | | |
|---|---|---|---|---|
| WO | WO-2009143164 A1 | * | 11/2009 | ......... A47G 19/2205 |
| WO | WO-2011091047 A1 | * | 7/2011 | ......... A47G 19/2205 |

*Primary Examiner* — Paul R Durand
*Assistant Examiner* — Michael J. Melaragno
(74) *Attorney, Agent, or Firm* — Kyle A. Fletcher, Esq.

(57) ABSTRACT

The refillable drinking container for use with a water-dispensing system. The refillable drinking container for use with a water-dispensing system stores a fluid that is consumed as a beverage. The refillable drinking container for use with a water-dispensing system measures the stored fluid. The refillable drinking container for use with a water-dispensing system refills the fluid when the volume of the stored fluid falls below a previously determined level. The refillable drinking container for use with a water-dispensing system heats the stored fluid at a previously determined temperature.

17 Claims, 8 Drawing Sheets

(56) References Cited

U.S. PATENT DOCUMENTS

| | | | | |
|---|---|---|---|---|
| 4,757,921 A * | 7/1988 | Snowball | B67D 3/0032 | 210/259 |
| 4,871,069 A * | 10/1989 | Guimont | A45C 9/00 | 383/110 |
| 5,046,529 A * | 9/1991 | Corella | E03B 11/06 | 137/592 |
| 5,090,075 A | 2/1992 | Larson | | |
| 5,106,512 A * | 4/1992 | Reidy | C02F 1/18 | 95/24 |
| 5,146,633 A * | 9/1992 | Kim | A47C 21/048 | 5/284 |
| 5,149,446 A * | 9/1992 | Reidy | E03B 3/28 | 62/93 |
| 5,248,417 A * | 9/1993 | Reid | B01D 24/42 | 210/136 |
| D342,393 S | 12/1993 | Discepolo | | |
| 5,271,837 A | 12/1993 | Discepolo | | |
| 5,553,459 A * | 9/1996 | Harrison | E03B 3/28 | 62/93 |
| 5,722,596 A * | 3/1998 | Dome | A47C 1/143 | 239/289 |
| 5,772,075 A * | 6/1998 | Ash, Jr | B67D 1/04 | 222/399 |
| 5,992,684 A * | 11/1999 | Russell | B67D 1/0861 | 222/335 |
| 6,058,718 A * | 5/2000 | Forsberg | C02F 9/005 | 62/150 |
| 6,230,513 B1 * | 5/2001 | Reinmuth | F25D 31/002 | 222/146.6 |
| 6,253,394 B1 * | 7/2001 | Goyette | E03C 1/01 | 4/626 |
| 6,354,342 B1 * | 3/2002 | Gagliano | B67D 1/0861 | 141/82 |
| 6,378,546 B1 * | 4/2002 | Hansen | E03B 11/02 | 137/376 |
| 6,513,343 B2 | 2/2003 | Pahl | | |
| 6,588,225 B1 * | 7/2003 | Hodgson | F25B 39/02 | 62/93 |
| 6,588,226 B1 * | 7/2003 | Semrow | C02F 9/005 | 62/390 |
| 6,915,924 B1 * | 7/2005 | Noiseux | E03B 11/02 | 222/64 |
| 6,945,063 B2 * | 9/2005 | Max | B01D 5/0042 | 136/246 |
| 6,966,464 B2 * | 11/2005 | Betkowski | A47C 7/02 | 222/192 |
| 8,123,290 B1 * | 2/2012 | Aiken | A47C 31/11 | 297/229 |
| 8,297,695 B1 * | 10/2012 | Aiken | A47C 31/11 | 297/229 |
| 8,302,412 B2 * | 11/2012 | Tieleman | C02F 3/1263 | 62/272 |
| 8,650,892 B2 * | 2/2014 | Ferreira | C02F 3/1263 | 62/272 |
| 8,763,655 B2 * | 7/2014 | Springer | B65D 1/06 | 141/2 |
| 8,777,182 B2 * | 7/2014 | Springer | A47G 19/2205 | 137/499 |
| 8,899,281 B2 * | 12/2014 | Russell | B67D 1/04 | 141/113 |
| 9,016,333 B2 * | 4/2015 | Shaffer | B67D 1/1272 | 141/113 |
| 9,284,174 B2 * | 3/2016 | Springer | B65D 1/06 | |
| 9,440,835 B2 * | 9/2016 | Springer | A47G 19/2205 | |
| 10,161,564 B1 * | 12/2018 | Delobel | A47C 7/622 | |
| 10,207,910 B2 * | 2/2019 | Springer | B67C 3/264 | |
| 10,219,631 B1 * | 3/2019 | Jimenez | A47C 7/622 | |
| 10,405,670 B1 * | 9/2019 | Mullenaux | B67D 1/0014 | |
| 10,612,215 B2 * | 4/2020 | Holbrook | E03B 11/02 | |
| 10,626,581 B1 * | 4/2020 | Mullenaux | B67D 1/08 | |
| 10,696,530 B2 * | 6/2020 | Springer | B65D 1/06 | |
| 10,759,644 B2 * | 9/2020 | Lim | B67C 3/026 | |
| 10,994,978 B1 * | 5/2021 | Mullenaux | B67D 1/0085 | |
| 11,066,286 B1 * | 7/2021 | Mullenaux | A47C 19/022 | |
| 2002/0029580 A1 * | 3/2002 | Faqih | F24F 13/222 | 62/93 |
| 2002/0046569 A1 * | 4/2002 | Faqih | C02F 9/005 | 62/93 |
| 2004/0000165 A1 * | 1/2004 | Max | E03B 3/28 | 62/615 |
| 2004/0049845 A1 * | 3/2004 | Gallant | A61G 7/0514 | 4/664 |
| 2004/0164093 A1 * | 8/2004 | Redman | A47K 5/1205 | 222/105 |
| 2005/0067434 A1 * | 3/2005 | Yu | B67D 3/0032 | 222/185.1 |
| 2005/0284167 A1 * | 12/2005 | Morgan | F24F 13/222 | 62/272 |
| 2006/0288709 A1 * | 12/2006 | Reidy | F25B 21/02 | 62/3.4 |
| 2007/0062972 A1 * | 3/2007 | Feldman | B67D 1/0029 | 222/129.1 |
| 2008/0223478 A1 * | 9/2008 | Hantsoo | B67D 1/0894 | 141/2 |
| 2008/0308176 A1 * | 12/2008 | Weems | B67D 1/0888 | 222/394 |
| 2009/0114091 A1 * | 5/2009 | Blum | B03C 3/16 | 95/72 |
| 2010/0025311 A1 * | 2/2010 | Jones | C02F 1/048 | 222/173 |
| 2011/0121020 A1 * | 5/2011 | Springer | B65D 1/06 | 222/23 |
| 2012/0103926 A1 * | 5/2012 | Ibsies | B65D 1/06 | 141/113 |
| 2012/0111889 A1 * | 5/2012 | Huff | A01G 25/09 | 222/143 |
| 2012/0267298 A1 * | 10/2012 | Hansen | C02F 1/4674 | 210/198.1 |
| 2012/0298676 A1 * | 11/2012 | Cooks | B65D 81/3216 | 220/592.21 |
| 2013/0118639 A1 * | 5/2013 | Springer | B67D 1/1275 | 141/2 |
| 2013/0220906 A1 * | 8/2013 | Stenhouse | E03B 3/28 | 165/80.1 |
| 2014/0182744 A1 * | 7/2014 | Shaffer | B67D 1/0894 | 222/181.1 |
| 2014/0209634 A1 * | 7/2014 | Metropulos | B67D 1/0041 | 222/608 |
| 2014/0239014 A1 * | 8/2014 | Gallaher | A45F 3/16 | 222/173 |
| 2014/0332113 A1 * | 11/2014 | Springer | F16K 27/07 | 141/94 |
| 2014/0345721 A1 * | 11/2014 | Keisel | E03B 11/02 | 137/565.17 |
| 2015/0096937 A1 * | 4/2015 | Munro | C02F 1/441 | 210/257.2 |
| 2015/0097001 A1 * | 4/2015 | Gatipon | B67D 1/0857 | 222/144.5 |
| 2015/0107281 A1 * | 4/2015 | West | F25D 21/14 | 62/93 |
| 2016/0031694 A1 * | 2/2016 | Orita | B67D 1/0861 | 222/638 |
| 2016/0060850 A1 * | 3/2016 | Johnson | E03B 11/06 | 137/565.17 |
| 2016/0231029 A1 | 8/2016 | Pan | | |
| 2016/0340165 A1 * | 11/2016 | Lim | A47G 19/2205 | |
| 2016/0376141 A1 * | 12/2016 | Springer | B67D 1/1272 | 141/1 |
| 2017/0001853 A1 * | 1/2017 | Park | A47G 19/2205 | |
| 2017/0275063 A1 * | 9/2017 | Melzer | B01D 29/11 | |
| 2018/0263394 A1 * | 9/2018 | Thomas | A47C 11/00 | |
| 2018/0332972 A1 * | 11/2018 | Jaeckel | A47C 7/622 | |
| 2018/0368599 A1 * | 12/2018 | Delobel | F16B 1/00 | |
| 2018/0370784 A1 * | 12/2018 | Bolender | B67D 1/0082 | |
| 2019/0010681 A1 * | 1/2019 | Shi | E03B 11/08 | |
| 2019/0031546 A1 * | 1/2019 | Hollingsworth | E03B 3/28 | |
| 2019/0153704 A1 * | 5/2019 | Gido | B01D 53/26 | |
| 2019/0177149 A1 * | 6/2019 | Springer | B67C 3/007 | |

(56) References Cited

U.S. PATENT DOCUMENTS

2019/0249400 A1* 8/2019 Holbrook ................ E03B 11/02
2019/0321784 A1* 10/2019 Dunham ................ B01D 61/12
2019/0329147 A1* 10/2019 Enzenhofer ............ F24F 3/1411
2021/0039942 A1* 2/2021 Springer ............ G06K 7/10297
2021/0283529 A1* 9/2021 Mullenaux ............... B60N 3/18

* cited by examiner

RE-FILLABLE DRINKING CONTAINER FOR USE WITH A WATER-DISPENSING SYSTEM

CROSS REFERENCES TO RELATED APPLICATIONS

This non-provisional application is a continuation-in-part application filed under 37 CFR 1.53(b) that claims the benefit of United States 35 USC 120 from non-provisional application U.S. Ser. No. 16/827,794 filed on Mar. 24, 2020 by the inventor: Thomas Mullenaux of San Pedro, Calif. The non-provisional application U.S. Ser. No. 16/827,794 is claimed in its entirety. The non-provisional application U.S. Ser. No. 16/519,213 is itself a continuation-in-part application filed under 37 CFR 1.53(b) that claimed the benefit of United States 35 USC 120 from non-provisional application U.S. Ser. No. 16/519,213 filed on Jul. 23, 2019 by the inventor: Thomas Mullenaux of San Pedro, Calif. The non-provisional application U.S. Ser. No. 16/519,213 is itself a continuation-in-part application filed under 37 CFR 1.53(b) that claimed the benefit of United States 35 USC 120 from non-provisional application U.S. Ser. No. 16/140,643 filed on Sep. 25, 2018 by the inventor: Thomas Mullenaux of San Pedro, Calif.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of kitchen equipment configured for use with furniture, more specifically, a drinking cup with integral heating means. (A47J36/2466)

This non-provisional application is a continuation-in-part application filed under 37 CFR 1.53(b) that claims the benefit of United States 35 USC 120 from non-provisional application U.S. Ser. No. 16/827,794 filed on Mar. 24, 2020 by the inventor: Thomas Mullenaux of San Pedro, Calif. The non-provisional application U.S. Ser. No. 16/827,794 is claimed in its entirety.

The non-provisional application U.S. Ser. No. 16/519,213 is itself a continuation-in-part application filed under 37 CFR 1.53(b) that claimed the benefit of United States 35 USC 120 from non-provisional application U.S. Ser. No. 16/519,213 filed on Jul. 23, 2019 by the inventor: Thomas Mullenaux of San Pedro, Calif. The non-provisional application U.S. Ser. No. 16/519,213 is itself a continuation-in-part application filed under 37 CFR 1.53(b) that claimed the benefit of United States 35 USC 120 from non-provisional application U.S. Ser. No. 16/140,643 filed on Sep. 25, 2018 by the inventor: Thomas Mullenaux of San Pedro, Calif.

The present disclosure will only reference the elements of the non-provisional application U.S. Ser. No. 16/827,794 that are relevant done for purposes of simplicity and clarity of exposition. The applicant notes that this disclosure incorporates non-provisional application U.S. Ser. No. 16/827,794 in its entirety into this application. The fact that any specific innovation selected from the one or more innovations disclosed within U.S. Ser. No. 16/827,794 is not addressed in this application should not be interpreted as an indication of defect in the above referenced patent.

Within this disclosure, the non-provisional application U.S. Ser. No. 16/827,794 will also be referred to as the prior disclosure.

The prior disclosure discloses a plurality of vessel structures. The water stored in the water reservoir flows through a first filter to remove impurities and is subsequently pumped to the valve. A valve starts and stops the flow of the water to the plurality of vessel structures. Each of the plurality of vessel structures is a mechanical structure that contains the drinking water in preparation for consumption. The plurality of vessel structures automatically refills the drinking water after the drinking water has been consumed.

SUMMARY OF INVENTION

This non-provisional application is a continuation-in-part application filed under 37 CFR 1.53(b) that claims the benefit of United States 35 USC 120 from non-provisional application US Mullenaux of San Pedro, Calif. The non-provisional application U.S. Ser. No. 16/827,794 is claimed in its entirety.

The non-provisional application U.S. Ser. No. 16/519,213 is itself a continuation-in-part application filed under 37 CFR 1.53(b) that claimed the benefit of United States 35 USC 120 from non-provisional application U.S. Ser. No. 16/519,213 filed on Jul. 23, 2019 by the inventor: Thomas Mullenaux of San Pedro, Calif. The non-provisional application U.S. Ser. No. 16/519,213 is itself a continuation-in-part application filed under 37 CFR 1.53(b) that claimed the benefit of United States 35 USC 120 from non-provisional application U.S. Ser. No. 16/140,643 filed on Sep. 25, 2018 by the inventor: Thomas Mullenaux of San Pedro, Calif.

The present disclosure will only reference the elements of the non-provisional application U.S. Ser. No. 16/827,794 that are relevant to the innovations disclosed within this application. This is done for purposes of simplicity and clarity of exposition. The applicant notes that this disclosure incorporates non-provisional application U.S. Ser. No. 16/827,794 in its entirety into this application. The fact that any specific innovation selected from the one or more innovations disclosed within U.S. Ser. No. 16/827,794 is not addressed in this application should not be interpreted as an indication of defect in the above referenced patent.

Within this disclosure, the non-provisional application US The refillable drinking container for use with a water-dispensing system is an instantiation of a vessel structure selected from the plurality of vessel structures that are disclosed by the prior disclosure. The refillable drinking container for use with a water-dispensing system stores a fluid that is consumed as a beverage. The refillable drinking container for use with a water-dispensing system measures the stored fluid. The refillable drinking container for use with a water-dispensing system refills the fluid when the volume of the stored fluid falls below a previously determined level. The refillable drinking container for use with a water-dispensing system heats the stored fluid at a previously determined temperature.

The refillable drinking container for use with a water-dispensing system comprises a pedestal structure, a cup structure, and a control circuit. The cup structure contains the stored fluid. The pedestal structure: a) stores the cup structure when not in use; and, b) provides the cup structure access to a water source such that the refillable drinking container for use with a water-dispensing system can refill itself. The control circuit: a) provides the electric energy necessary to operate the refillable drinking container for use with a water-dispensing system; b) controls the level of the the temperature of the stored fluid contained in the cup structure.

These together with additional objects, features and advantages of the refillable drinking container for use with a water-dispensing system will be readily apparent to those of ordinary skill in the art upon reading the following detailed description of the presently preferred, but nonetheless illustrative, embodiments when taken in conjunction with the accompanying drawings.

In this respect, before explaining the current embodiments of the refillable drinking container for use with a water-dispensing system in detail, it is to be understood that the refillable drinking container for use with a water-dispensing system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the refillable drinking container for use with a water-dispensing system.

It is therefore important that the claims be regarded as including such equivalent construction insofar as they do not container for use with a water-dispensing system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5 is a detail view of an embodiment of the

DETAILED DESCRIPTION OF THE EMBODIMENT

Figure 1:
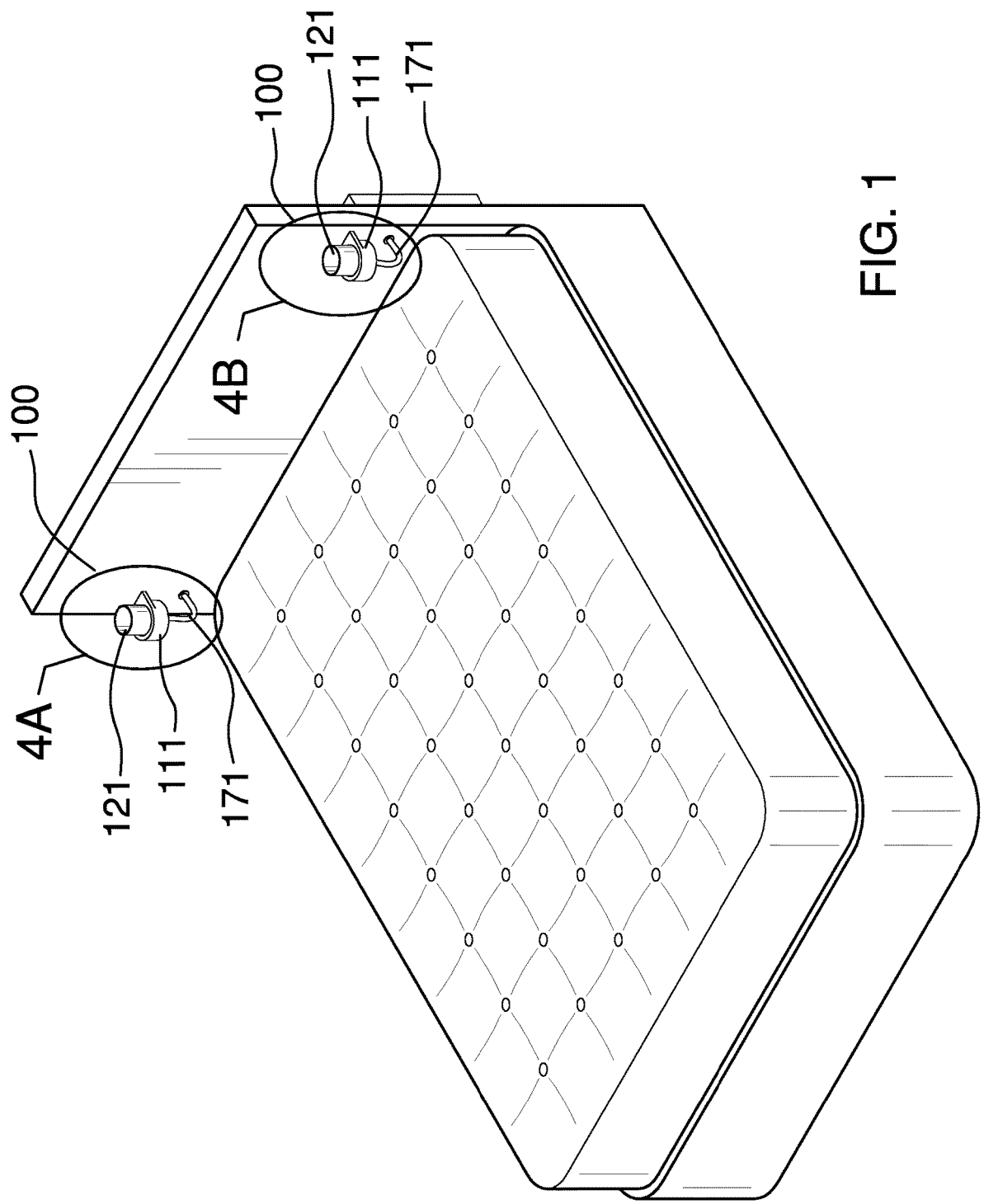
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

This non-provisional application is a continuation-in-part application filed under 37 CFR 1.53(b) that claims the benefit of United States 35 USC 120 from non-provisional application US Mullenaux of San Pedro, Calif. The non-provisional application U.S. Ser. No. 16/827,794 is claimed in its entirety.

The non-provisional application U.S. Ser. No. 16/519,213 is itself a continuation-in-part application filed under 37 CFR 1.53(b) that claimed the benefit of United States 35 USC 120 from non-provisional application U.S. Ser. No. 16/519,213 filed on Jul. 23, 2019 by the inventor: Thomas Mullenaux of San Pedro, Calif. The non-provisional application U.S. Ser. No. 16/519,213 is itself a continuation-in-part application filed under 37 CFR 1.53(b) that claimed the benefit of United States 35 USC 120 from non-provisional application U.S. Ser. No. 16/140,643 filed on Sep. 25, 2018 by the inventor: Thomas Mullenaux of San Pedro, Calif.

The present disclosure will only reference the elements of the non-provisional application U.S. Ser. No. 16/827,794 that are relevant to the innovations disclosed within this application. This is done for purposes of simplicity and clarity of exposition. The applicant notes that this disclosure incorporates non-provisional application U.S. Ser. No. 16/827,794 in its entirety into this application. The fact that any specific innovation selected from the one or more innovations disclosed within U.S. Ser. No. 16/827,794 is not addressed in this application should not be interpreted as an indication of defect in the above referenced patent.

Within this disclosure, the non-provisional application US The refillable drinking container for use with a water-dispensing system is an instantiation of a vessel structure selected from the plurality of vessel structures that are disclosed by the prior disclosure. The refillable drinking container for use with a water-dispensing system stores a fluid that is consumed as a beverage. The refillable drinking container for use with a water-dispensing system measures the stored fluid. The refillable drinking container for use with a water-dispensing system refills the fluid when the volume of the stored fluid falls below a previously determined level. The refillable drinking container for use with a water-dispensing system heats the stored fluid at a previously determined temperature.

The refillable drinking container for use with a water-dispensing system comprises a pedestal structure, a cup structure, and a control circuit. The cup structure contains the stored fluid. The pedestal structure: a) stores the cup structure when not in use; and, b) provides the cup structure access to a water source such that the refillable drinking container for use with a water-dispensing system can refill itself. The control circuit: a) provides the electric energy necessary to operate the refillable drinking container for use with a water-dispensing system; b) controls the level of the stored fluid contained in the cup structure; and, c) controls the temperature of the stored fluid contained in the cup structure.

Specification:

This non-provisional application is a continuation-in-part application filed under 37 CFR 1.53(b) that claims the benefit of United States 35 USC 120 from non-provisional application U.S. Ser. No. 16/827,794 filed on Mar. 24, 2020 by the inventor: Thomas Mullenaux of San Pedro, Calif. The non-provisional application U.S. Ser. No. 16/827,794 is claimed in its entirety.

The non-provisional application U.S. Ser. No. 16/519,213 is itself a continuation-in-part application filed under 37 CFR 1.53(b) that claimed the benefit of United States 35 USC 120 from non-provisional application U.S. Ser. No. 16/519,213 filed on Jul. 23, 2019 by the inventor: Thomas Mullenaux of San Pedro, Calif. The non-provisional application U.S. Ser. No. 16/519,213 is itself a continuation-in-part application filed under 37 CFR 1.53(b) that claimed the benefit of United States 35 USC 120 from non-provisional application U.S. Ser. No. 16/140,643 filed on Sep. 25, 2018 by the inventor: Thomas Mullenaux of San Pedro, Calif.

The present disclosure will only reference the elements of the non-provisional application U.S. Ser. No. 16/827,794 that are relevant to the innovations disclosed within this application. This is done for purposes of simplicity and clarity of exposition. The applicant notes that this disclosure incorporates non-provisional application U.S. Ser. No. 16/827,794 in its entirety into this application. The fact that any specific innovation selected from the one or more innovations disclosed within U.S. Ser. No. 16/827,794 is not addressed in this application should not be interpreted as an indication of defect in the above referenced patent.

Within this disclosure, the non-provisional application U.S. Ser. No. 16/827,794 will also be referred to as the prior disclosure.

Figure 2:
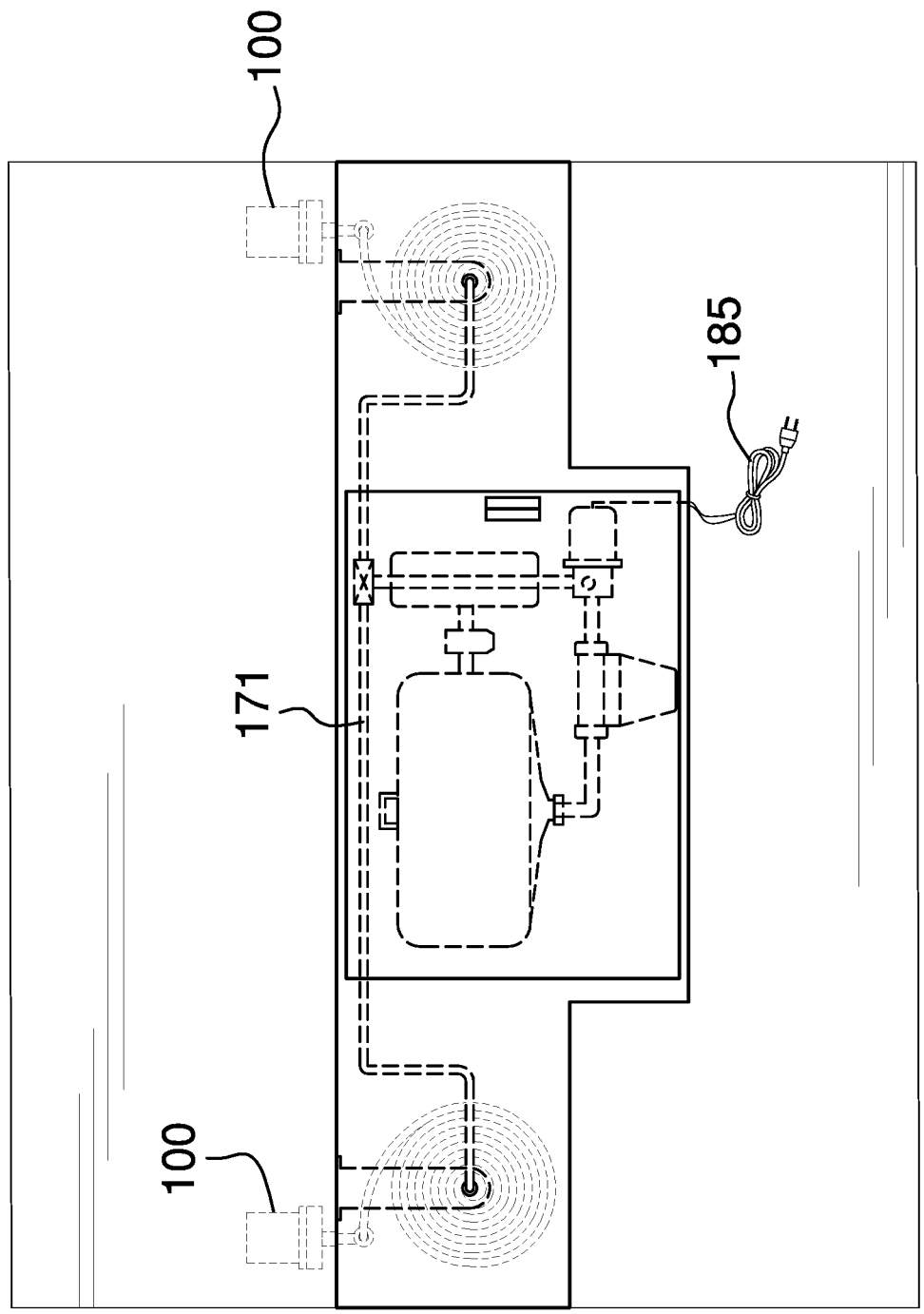
FIG. 2 is a diagram of an embodiment of the disclosure.
Figure 3:
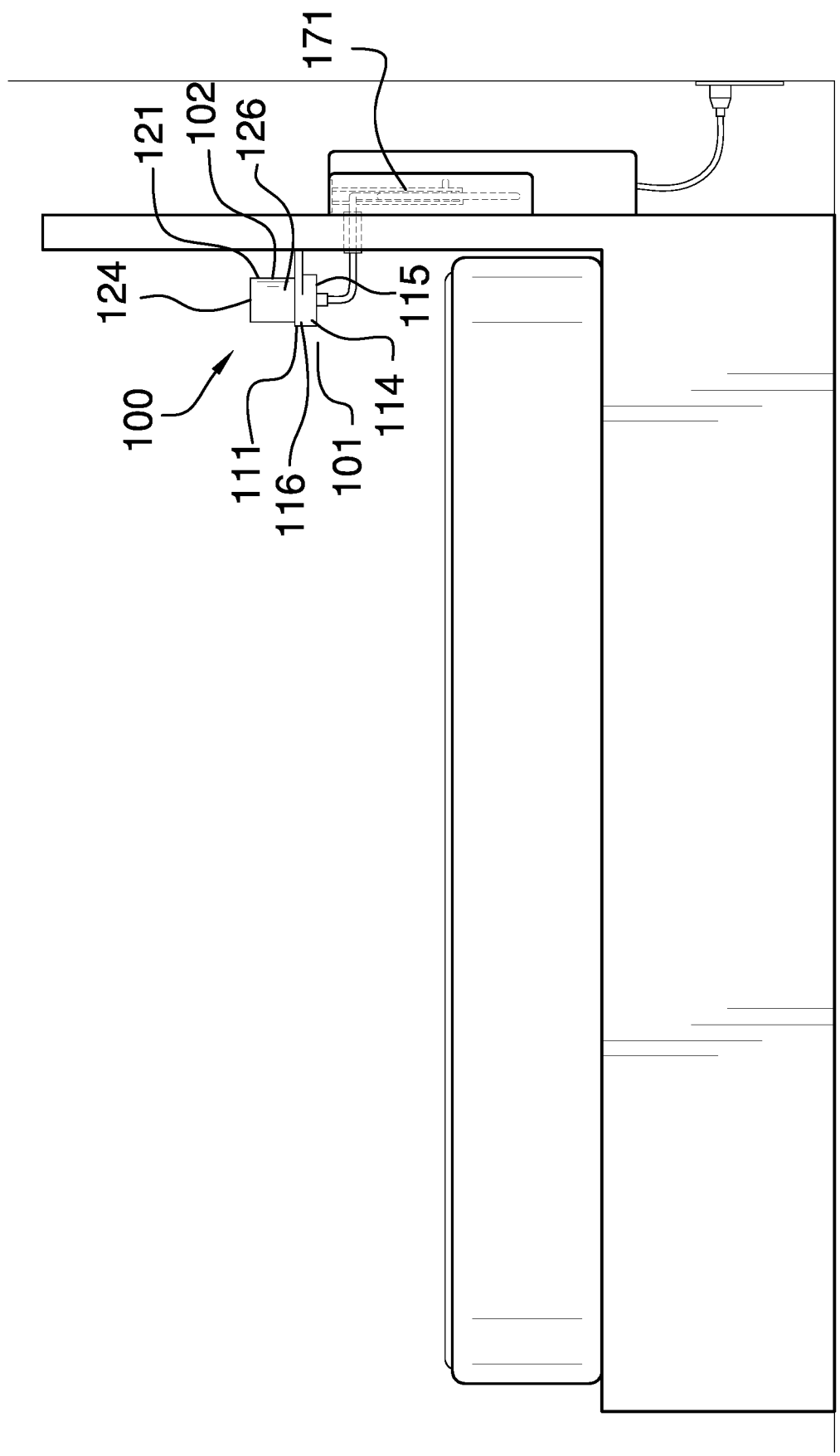
FIG. 3 is a side view of an embodiment of the disclosure.
Figure 4A:
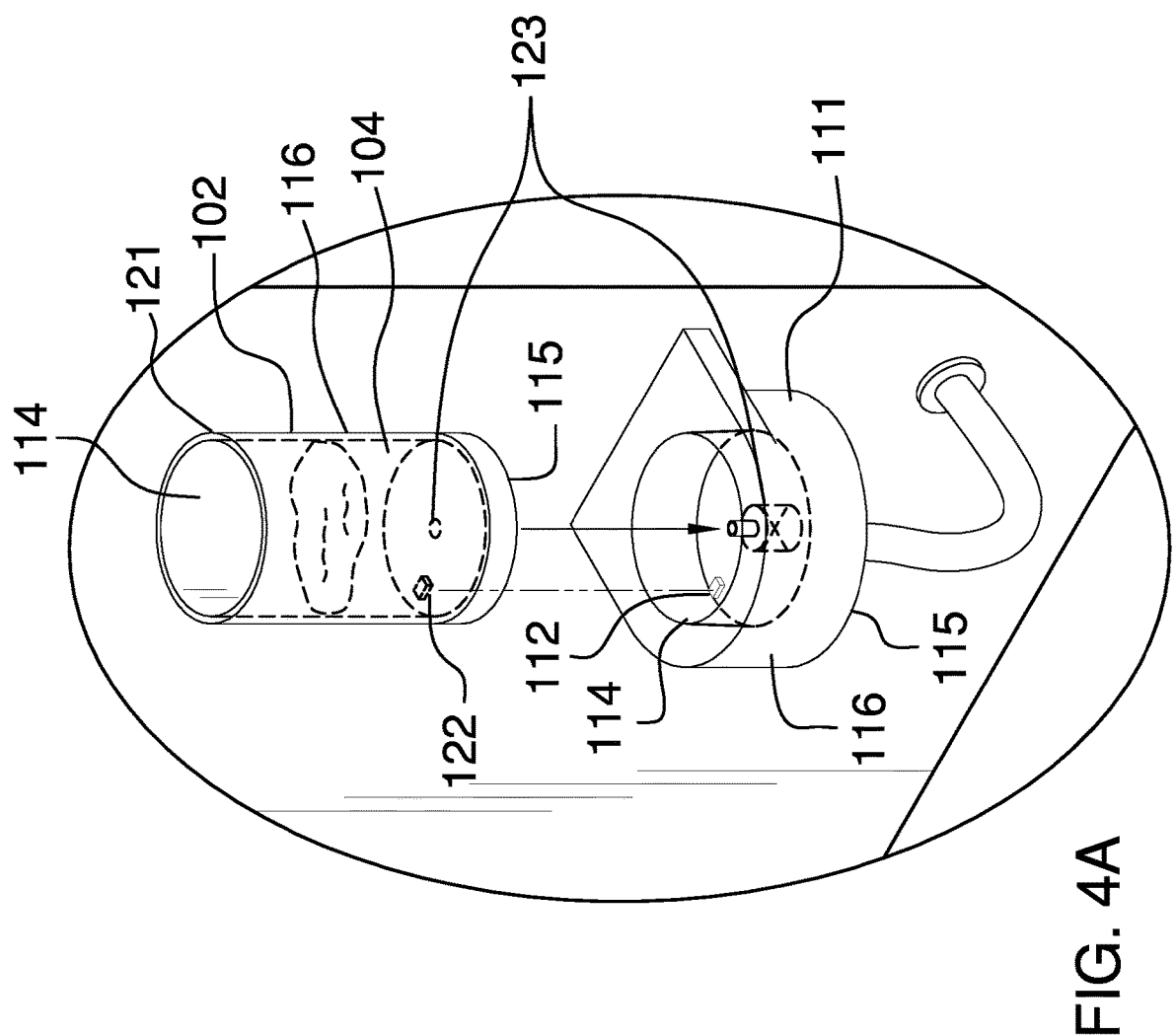
FIG. 4A is a detail view of an embodiment of the disclosure.
Figure 4B:
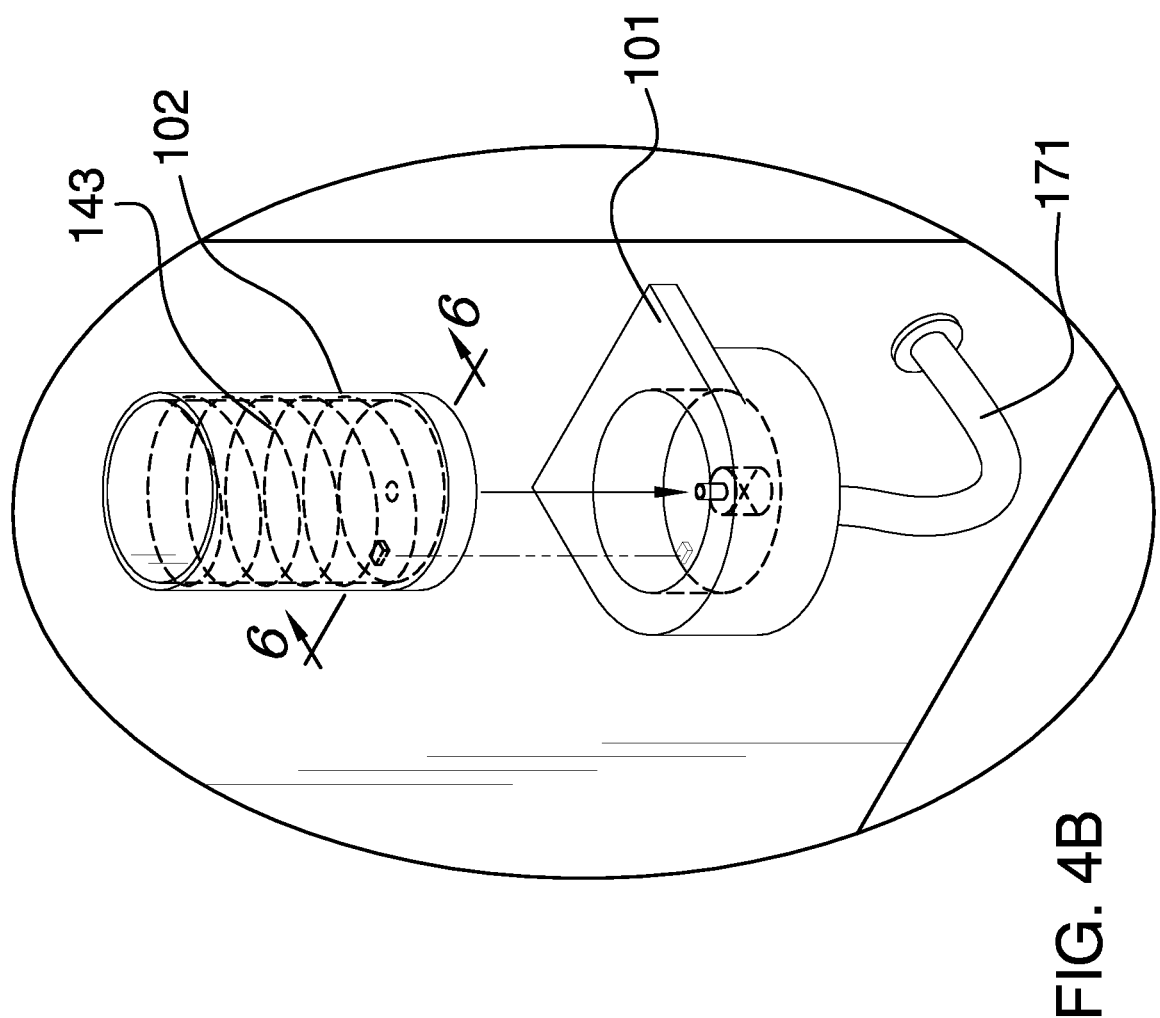
FIG. 4B is a detail view of an embodiment of the disclosure.
Figure 5:
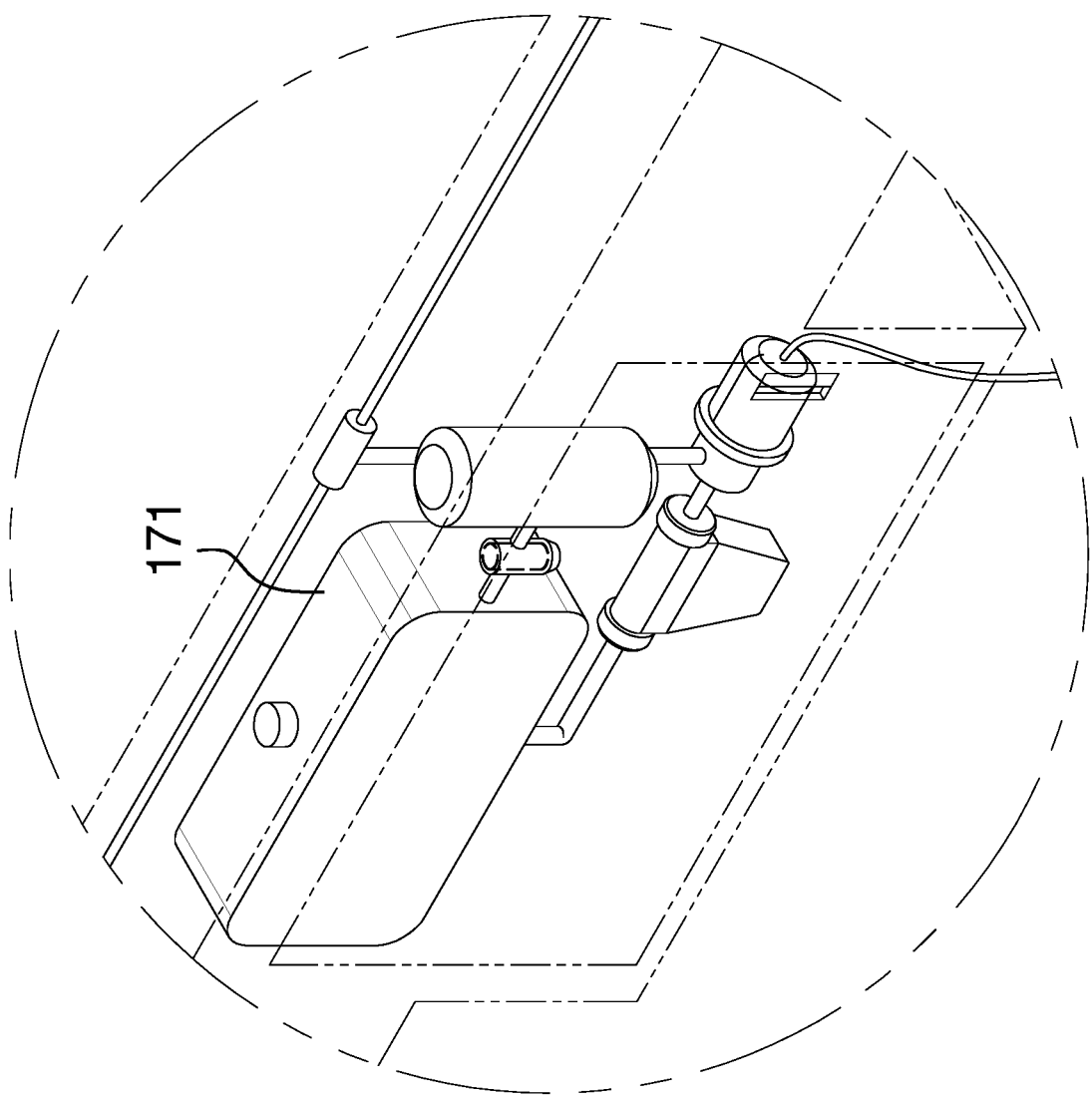
Figure 6:
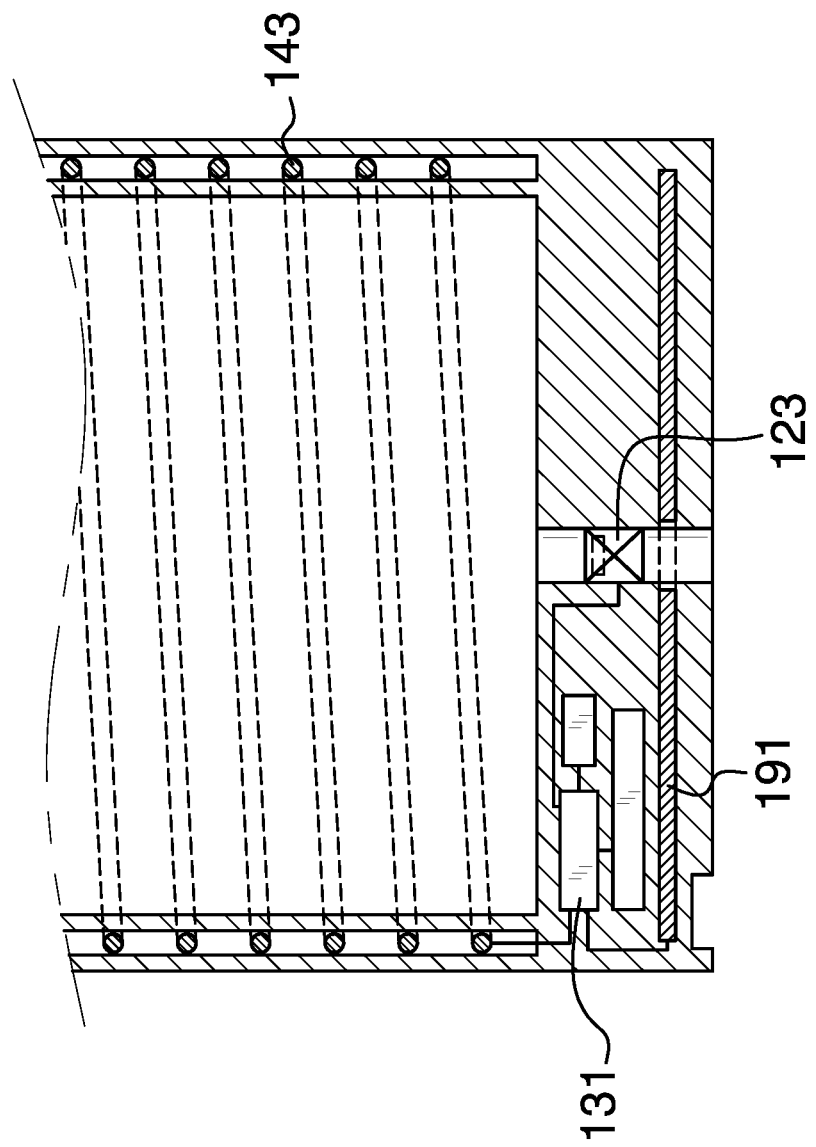
FIG. 6 is a cross-sectional view of an embodiment of the disclosure across 6-6 as shown in FIG. 4B.

Detailed reference will now be made to one or more potential embodiments of the disclosure, which are illustrated in FIGS. 1 through 6.

The refillable drinking container for use with a water-dispensing system 100 (hereinafter invention) is an instantiation of a vessel structure selected from the plurality of vessel structures that are disclosed by the prior disclosure. The invention 100 stores a fluid 104. The invention 100 measures the stored fluid 104. The invention 100 refills the fluid 104 when the volume of the stored fluid 104 falls below a previously determined level. The invention 100 heats the stored fluid 104 at a previously determined temperature. The fluid 104 is a liquid that is consumed as a beverage. The terms fluid 104 and liquid are defined elsewhere in this disclosure.

The invention 100 comprises a pedestal structure 101, a cup structure 102, and a control circuit 103. The cup structure 102 contains the stored fluid 104. The pedestal structure 101: a) stores the cup structure 102 when not in use; and, b) provides the cup structure 102 access to a water source such that the invention 100 can refill itself. The control circuit 103: a) provides the electric energy necessary to operate the invention 100; b) controls the level of the stored fluid 104 contained in the cup structure 102; and, c) controls the temperature of the stored fluid 104 contained in the cup structure 102.

The pedestal structure 101 is a mechanical structure. The pedestal structure 101 receives the cup structure 102 for storage. The pedestal structure 101 transfers the load of the cup structure 102 and the control circuit 103 to an externally provided object such as a furniture item. The pedestal structure 101 comprises a pedestal pan 111 and a pedestal tenon 112.

The pedestal pan 111 is a prism-shaped structure. The pedestal pan 111 has a disk shape. The pedestal pan 111 is formed as a pan. The pedestal pan 111 forms the load path the transfers the load of the cup structure 102 and the control circuit 103 to the externally provided object such as a furniture item. The pedestal pan 111 forms the physical structure that receives and stores the cup structure 102 when the cup structure 102 is not in use. The cup structure 102 inserts into the hollow interior of the pedestal pan 111 for storage. The cup structure 102 inserts into the pedestal pan 111 through the pedestal open face 114. The pedestal pan 111 further comprises a pedestal open face 114, a pedestal closed face 115, and a plurality of pedestal lateral faces 116.

The pedestal open face 114 is the open face of the pan structure of the pedestal pan 111. The pedestal open face 114 is formed in a congruent end of the disk structure of the pedestal pan 111. The pedestal open face 114 forms the superior surface of the pedestal pan 111. The pedestal closed face 115 is the closed face of the pan structure of the pedestal pan 111. The pedestal closed face 115 is formed in a congruent end of the disk structure of the pedestal pan 111. The pedestal closed face 115 forms the inferior surface of the pedestal pan 111. The pedestal closed face 115 is the surface of the pedestal pan 111 that is distal from the pedestal open face 114. The plurality of pedestal lateral faces 116 forms the lateral face of the disk structure of the pedestal pan 111. The plurality of pedestal lateral faces 116 forms the vertically oriented containment boundaries of the hollow interior of the pedestal pan 111.

The pedestal tenon 112 is a prism-shaped structure. The tenon is defined elsewhere in this disclosure. The pedestal tenon 112 mounts on the interior surface of the pedestal closed face 115 of the pedestal pan 111. The pedestal tenon 112 inserts into the hollow interior of the pedestal pan 111. The pedestal tenon 112 forms a tenon that inserts into the cup structure 102 as the cup structure 102. The pedestal tenon 112 properly aligns the cup structure 102 within the pedestal pan 111.

The cup structure 102 is a mechanical structure. The cup structure 102 contains the fluid 104 in anticipation of consumption. The cup structure 102 removably inserts into the pedestal structure 101 for storage. The cup structure 102 comprises a cup pan 121, a cup mortise 122, and a cup check valve 123.

The cup pan 121 is a prism-shaped structure. The cup pan 121 has a pan shape. The cup pan 121 is a fluid 104 impermeable containment structure. The cup pan 121 contains the fluid 104 in anticipation of the consumption of the fluid 104. The pan structure of the cup pan 121 is geometrically similar to the pan structure of the pedestal pan 111 such that the cup pan 121 inserts into the pedestal pan 111 for storage. The cup pan 121 further comprises a cup open face 124, a cup closed face 125, and a plurality of cup lateral faces 126.

The cup open face 124 is the open face of the pan structure of the cup pan 121. The cup open face 124 is formed in a congruent end of the disk structure of the cup pan 121. The cup open face 124 forms the superior surface of the cup pan 121. The cup closed face 125 is the closed face of the pan structure of the cup pan 121. The cup closed face 125 is formed in a congruent end of the disk structure of the cup pan 121. The cup closed face 125 forms the inferior surface of the cup pan 121. The cup closed face 125 is the surface of the cup pan 121 that is distal from the cup open face 124. The plurality of cup lateral faces 126 forms the lateral face of the disk structure of the cup pan 121. The plurality of cup lateral faces 126 forms the vertically oriented containment boundaries of the hollow interior of the cup pan 121.

The cup mortise 122 is a negative space that is formed in the pedestal closed face 115 of the pan structure of the cup pan 121. The cup mortise 122 is geometrically similar to the pedestal tenon 112 of the pedestal pan 111 such that the pedestal tenon 112 inserts into the cup mortise 122. The cup mortise 122 is positioned on the exterior surface of the pedestal closed face 115 such that the cup pan 121 is properly oriented relative to the pedestal pan 111 when the pedestal tenon 112 inserts into the cup mortise 122.

The cup check valve 123 is a check valve that installs in the pedestal closed face 115 of the cup pan 121. The cup check valve 123 forms a fluidic link between the water source 171 and the cup structure 102 such that the fluid 104 only flows in one direction. The cup check valve 123 limits the direction of the flow of the fluid 104 from the water source 171 into the cup pan 121 for storage.

The control circuit 103 is an electric circuit. A portion of the control circuit 103 mounts in the pedestal structure 101. The balance of the control circuit 103 mounts in the cup structure 102. The control circuit 103: a) provides the electric energy necessary to operate the invention 100; b) controls the level of the stored fluid 104 contained in the cup structure 102; and, c) controls the temperature of the stored fluid 104 contained in the cup structure 102. The control circuit 103 is an independently powered electric circuit. By independently powered is meant that the control circuit 103 can maintain the temperature of the stored fluid without an electrical connection to an external power source when the cup structure 102 is removed from the pedestal structure 101. The control circuit 103 comprises an operating circuit 131 and a wireless power circuit 132. The operating circuit 131 and the wireless power circuit 132 are electrically connected.

The operating circuit 131 is an electric circuit. The operating circuit 131 measures the quantity of fluid 104 contained in the cup mortise 122. The operating circuit 131 measures the temperature of the fluid 104 contained in the cup mortise 122. The operating circuit 131 pumps the fluid 104 from the water source 171 through the cup check valve 123 into the cup pan 121. The operating circuit 131 maintains a previously determined level of fluid 104 within the cup pan 121. The operating circuit 131 heats the fluid 104 within the cup pan 121 such that a minimum temperature is maintained.

The operating circuit 131 comprises a logic module 141, a metered pump 142, and a heating element 143. The logic module 141, the metered pump 142, and the heating element 143 are electrically connected. The metered pump 142 forms a fluidic link between a water source 171 and a water discharge 172. The water source 171 is the fluid 104 source used to replenish the fluid 104 contained in the cup pan 121. The prior disclosure provides the water source 171 for this invention 100. The water discharge 172 is a port that allows for the discharge of the fluid 104 from the metered pump 142 into the cup pan 121.

The logic module 141 is an electric circuit. The logic module 141 monitors the quantity of fluid 104 contained in the cup mortise 122. The logic module 141 monitors the temperature of the fluid 104 contained in the cup mortise 122. The logic module 141 controls the operation of the metered pump 142 to control the volume of the fluid 104 contained in the cup pan 121. The logic module 141 controls the flow of electric energy into the heating element 143 to control the temperature of the fluid 104 contained in the cup pan 121. The logic module 141 further comprises a conductive sensor 161, a temperature sensor 162, a transistor 163, and a limit resistor 164. The conductive sensor 161, the temperature sensor 162, the transistor 163, and the limit resistor 164 electrically connect to the logic module 141.

The conductive sensor 161 is a sensor. The conductive sensor 161 is defined elsewhere in this disclosure. The conductive sensor 161 generates an electric signal that is a function of the volume of fluid 104 that is contained in the cup pan 121. The logic module 141 monitors the electric signal generated by the conductive sensor 161. When the conductive sensor 161 indicates that the volume of fluid 104 has fallen below a previously determined level, the logic module 141 initiates the operation of the metered pump 142.

The temperature sensor 162 is a sensor. The temperature sensor 162 generates an electric signal that is a function of the temperature of fluid 104 that is contained in the cup pan 121. The logic module 141 monitors the electric signal generated by the temperature sensor 162. When the temperature sensor 162 indicates that the temperature of fluid 104 has fallen below a previously determined temperature the logic module 141 initiates the operation of the heating element 143.

The transistor 163 is an electric switching device. The transistor 163 is defined elsewhere in this disclosure. The transistor 163 operates as a switch. When a voltage is applied to the base, current will flow into the base and the transistor 163 will act like a closed switch allowing current to flow from the collector to the emitter. When the voltage is removed from the base, the transistor 163 will act like an open switch disrupting current flow from the collector to the emitter. The logic module 141 controls the operation of the transistor 163 by controlling the flow of electric current into the base of the transistor 163. The transistor 163 is electrically connected between the wireless power circuit 132 and the metered pump 142 such that the transistor 163 controls the flow of electric energy into the metered pump 142.

The limit resistor 164 is an electrical circuit element. The limit resistor 164 electrically connects between the logic module 141 and the transistor 163. The limit resistor 164 limits the amount of electric current that can flow from the logic module 141 into the base of the transistor 163.

The metered pump 142 is a pump that draws fluid 104 through the cup check valve 123 from the water source 171 and discharges the drawn fluid 104 through a water discharge 172 into the cup pan 121. The metered pump 142 is defined elsewhere in this disclosure. The metered pump 142 mounts in the cup closed face 125 of the cup pan 121. The logic module 141 controls the operation of the metered pump 142 by controlling the flow of electric energy into the metered pump 142. The metered pump 142 measures the volume of fluid 104 that is pumped into the cup pan 121.

The heating element 143 is a resistive heating device. The heating element 143 is defined elsewhere in this disclosure. The heating element 143 mounts in the plurality of cup lateral faces 126 of the cup pan 121. The heating element 143 generates the heat used to warm the fluid 104 when electric energy flows through the heating element 143. The logic module 141 controls the operation of the heating element 143 by controlling the flow of electric energy into the heating element 143.

The wireless power circuit 132 is an electrical circuit. The wireless power circuit 132 powers the operation of the control circuit 103. The wireless power circuit 132 is an electrochemical device. The wireless power circuit 132 converts chemical potential energy into the electrical energy required to power the control circuit 103. The wireless power circuit 132: a) draws AC electrical energy from a national electric grid 185; and, b) wirelessly broadcasts the AC electrical energy received from the national electric grid 185 to the induction circuit. The wireless power circuit 132 comprises an energy broadcast circuit 151 and an induction circuit 152. The wireless power circuit 132 comprises an energy broadcast circuit 151 and an induction circuit 152.

The energy broadcast circuit 151 and the induction circuit 152 are inductively coupled to form an inductive charging device.

The energy broadcast circuit 151 broadcasts the AC electrical energy received from the national electric grid 185 to the induction circuit 152. The induction circuit 152 electrically connects to and provides electrical energy to an electric circuit. The induction circuit 152: a) receives the AC electrical energy broadcast from the energy broadcast circuit 151; b) converts the received AC electrical energy into DC electrical energy suitable for use by the control circuit 103 associated with the selected induction circuit; and, c) transfers the DC electrical energy to a battery 194.

The energy broadcast circuit 151 is an electrical circuit. The energy broadcast circuit 151 draws AC electrical energy from the national electric grid 185. The energy broadcast circuit 151 processes the AC electrical energy for broadcast. The energy broadcast circuit 151 broadcasts the processed AC electrical energy to the induction circuit 152. The energy broadcast circuit 151 comprises a first AC/DC converter 181, a frequency generating circuit 182, a first amplifier 183, a broadcast antenna 184, and a national electric grid 185. The first AC/DC converter 181, the frequency generating circuit 182, the first amplifier 183, the broadcast antenna 184, and the national electric grid 185 are electrically interconnected.

The first AC/DC converter 181 is an AC/DC converter. The first AC/DC converter 181 electrically connects to the national electric grid 185. The first AC/DC converter 181 receives AC electrical energy from the national electric grid 185 and converts the AC electrical energy into a regulated DC voltage.

The frequency generating circuit 182 is an electrical circuit. The frequency generating circuit 182 is an oscillating circuit that receives DC electrical energy from the DC regulated voltage provided by the first AC/DC converter 181. The frequency generating circuit 182 generates an AC electrical voltage at the broadcast frequency of the energy broadcast circuit 151.

The first amplifier 183 is an electrical circuit. The first amplifier 183 is a power amplifier. The first amplifier 183 receives as an input the AC voltage generated by the frequency generating circuit 182 and amplifies the received AC electrical voltage such that the signal broadcast by the energy broadcast circuit 151 contains sufficient energy to broadcast electrical energy for use by the induction circuit 152.

The broadcast antenna 184 is an electrical device. The broadcast antenna 184 receives the amplified AC electrical energy from the first amplifier 183 and broadcasts the amplified AC electrical energy as electromagnetic radiation to the induction circuit 152.

The national electric grid 185 is a source of the electrical energy required to operate the wireless power circuit 132. The national electric grid 185 is defined elsewhere in this disclosure.

The design and use of an AC/DC converter, a frequency generating circuit 182, the first amplifier 183, and the broadcast antenna 184 are well-known and documented in the electrical arts.

The induction circuit 152 is an electrical circuit. The induction circuit 152 comprises a battery 194, an induction antenna 191, a second AC/DC converter 192, and a voltage regulator 193. The battery 194, the induction antenna 191, the second AC/DC converter 192, and the voltage regulator 193 are electrically interconnected. The induction circuit 152 receives the AC electrical energy broadcast from the energy broadcast circuit 151 and processes the received AC electrical energy into a regulated DC voltage that recharges the battery 194 with DC electrical energy.

The induction antenna 191 is an electrical device. The induction antenna 191 receives the electromagnetic radiation generated by the energy broadcast circuit 151 and converts the received electromagnetic radiation into AC electrical energy. The induction antenna 191 electrically connects the received AC electrical energy to the second AC/DC converter 192 for processing.

The second AC/DC converter 192 is an AC/DC converter. The second AC/DC converter 192 electrically connects to the induction antenna 191. The second AC/DC converter 192 receives AC electrical energy from the induction antenna 191 and converts the AC electrical energy into a source of DC electrical energy with an unregulated DC voltage.

The voltage regulator 193 is an electrical circuit. The voltage regulator 193 converts the unregulated DC electrical energy received from the second AC/DC converter 192 into a regulated DC voltage source that provides regulated DC electrical energy to the battery 194. The battery 194 is an electrochemical device. The battery 194 converts chemical potential energy into the electrical energy used to power the control circuit 103. The diode 195 is an electrical device that limits the flow of electricity to one direction. The diode 195 installs between the battery 194 and the voltage regulator 193 such that electricity will not back flow from the battery 194 into the voltage regulator 193.

The following definitions were used in this disclosure:

AC: As used in this disclosure, AC is an acronym for alternating current.

AC/DC Converter: As used in this disclosure, an AC/DC converter is an electrical device that converts an AC voltage into a regulated DC voltage by rectifying and regulating the AC voltage. Method to design and build AC/DC converters are well known in the electrical arts. The AC/DC converter is further defined with a positive terminal, a negative terminal and a power input.

Algorithm: As used in this disclosure, an algorithm is a previously defined procedure used to perform a specified task.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Amplifier: As used in this disclosure, an amplifier refers to an electronic component that increases voltage, current, or power of an input signal. Specifically, within this disclosure, an amplifier refers to a differential amplifier. A differential amplifier is a device with two inputs with a single output. A differential amplifier amplifies the voltage difference between the two inputs. The gain of an amplifier is defined as the ratio of the output to the input as measured in a set of units selected from the group consisting of electric voltage, electric current, and electric power. Electric voltage is the most commonly selected unit.

Ball Valve: As used in this disclosure, a ball valve is a type of commercially available check valve.

Battery: As used in this disclosure, a battery is a chemical device consisting of one or more cells, in which chemical energy is converted into electricity and used as a source of power. Batteries are commonly defined with a positive terminal and a negative terminal.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Check Valve: As used in this disclosure, a check valve is a valve that permits the flow of fluid in a single direction. Within selected potential embodiments of this disclosure, the check valve is a commercially available product that is selected from the group consisting of a ball valve and a Tesla valve.

Conductive Sensor: As used in this disclosure, a conductive sensor is a sensor used to detect the presence of a conductive liquid such as water. The conductive sensor comprises two electric terminals that present an electric voltage across them. An electric current passes between the two electrodes when the conductive liquid simultaneously immerses the two electrodes. A conductive sensor can be used to detect when the conductive liquid reaches a previously determined level by the placement of one of the two electrodes at that level.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Cup: As used in this disclosure, a cup is a container that is intended to contain a fluid. The cup has a shape that roughly corresponds to a pan. Glass, mug, stein, and tumbler are synonyms for a cup.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

External Power Source: As used in this disclosure, an external power source is a source of the energy that is externally provided to enable the operation of the present disclosure. Examples of external power sources include, but are not limited to, electrical power sources and compressed air sources.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets).

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Heating Element: As used in this disclosure, a heating element is a resistive wire that is used to convert electrical energy into heat. Common metal combinations used to form heat elements include a combination of nickel and Chromium (typical: 80/20), a combination of iron, chromium and aluminum (typical 70/25/5), a combination of copper, nickel, iron, and manganese (typical 66/30/2/2) (use for continuously hot), and platinum.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Induction: As used in this disclosure, induction refers to a process where a first process selected from the group consisting of an electric current or an electromagnetic field generates or interacts with a second process selected from the group consisting of an electric current or an electromagnetic field.

Inductive Charging Device: As used in this disclosure, an inductive charging device is an electrical device. The inductive charging device transfers energy from a first electric device to a second electric device. The first electric device transfers electric energy to the second electric device using induction.

Inferior: As used in this disclosure, the term inferior refers to a directional reference that is parallel to and in the same direction as the force of gravity when an object is positioned or used normally.

Instantiation: As used in this disclosure, an instantiation refers to a specific physical object or process that is created using a specification.

Limit Resistor: As used in this disclosure, a limit resistor is an electrical resistor that is used to limit the flow of electric current through an electrical circuit.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Metered Pump: As used in this disclosure, a metered pump is a pump that pumps a fluid at a specified volumetric flow rate that is independent of the pressure of the fluid entering the pump. The accuracy of a metered pump is assumed to be less than 3% of the specified volumetric flow rate over the specified operating range of the fluid pressure entering the pump. Commercially available metered pumps exist that are significantly more accurate than 3%.

Mortise: As used in this disclosure, a mortise is a prism-shaped negative spaced formed in an object that is designed to receive a geometrically similar object referred to as a tenon.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid sells electrical power for use by an electrical load. The national electric grid invoices for electrical power based on the total energy consumed by the electrical load. The national electric grid measures the energy consumption of an electrical load with an electrical meter. The national electric grid provides power through electrical connections known as a hot lead and a neutral lead.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of the prism structure of the pan and/or a portion of the closed lateral faces of the pan is are open.

Pedestal: As used in this disclosure, a pedestal is an intermediary load bearing structure that that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Resistance: As used in this disclosure, resistance refers to the opposition provided by an electrical circuit (or circuit element) to the electrical current created by a DC voltage is presented across the electrical circuit (or circuit element). The term impedance is often used for resistance when referring to an AC voltage that is presented across the electrical circuit (or circuit element).

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Superior: As used in this disclosure, the term superior refers to a directional reference that is parallel to and in the opposite direction of the force of gravity when an object is positioned or used normally.

Tenon: As used in this disclosure, a tenon is a prism-shaped structure that fits into a mortise such that the tenon attaches to the mortise. The tenon is geometrically similar to the mortise.

Transistor: As used in this disclosure, a transistor is a general term for a three terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

Valve: As used in this disclosure, a valve is a device that is used to control the flow of a fluid (gas or liquid) through a pipe, tube, or hose.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Figure 7:
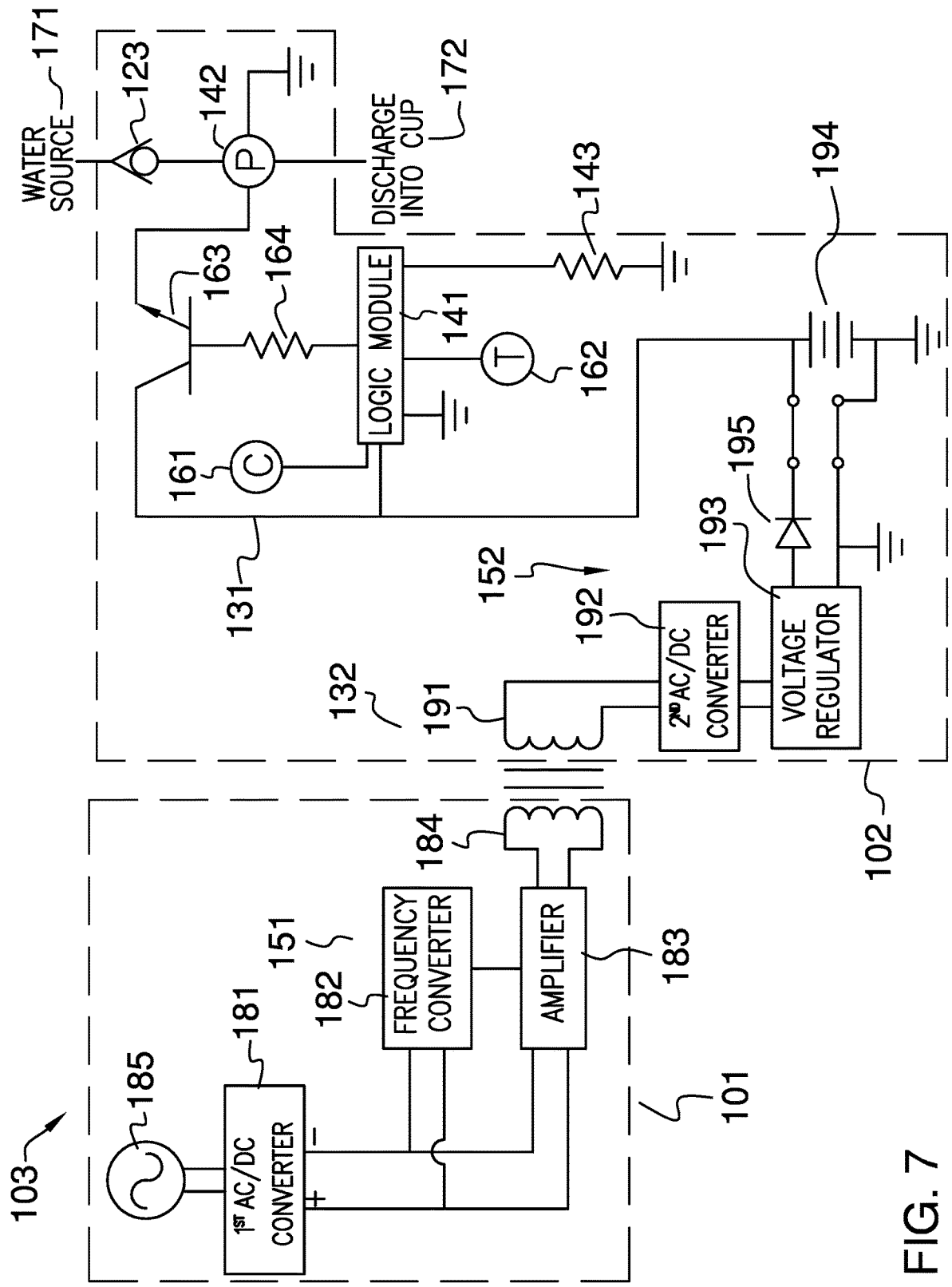
FIG. 7 is a schematic view of an embodiment of the disclosure.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A refillable drinking container comprising
a pedestal structure, a cup structure, and a control circuit;
wherein the pedestal structure: a) stores the cup structure when not in use; and, b) provides the cup structure access to a water source such that the refillable drinking container can refill itself with a stored fluid from the water source;
wherein the control circuit: a) provides the electric energy necessary to operate the refillable drinking container; b) controls the level of the stored fluid contained in the cup structure; and, c) controls the temperature of the stored fluid contained in the cup structure;
wherein the refillable drinking container measures a stored fluid;
wherein the refillable drinking container refills the stored fluid when the volume of the stored fluid falls below a previously determined level;
wherein the refillable drinking container heats the stored fluid at a previously determined temperature;
wherein the cup structure contains the stored fluid;
wherein the pedestal structure is a mechanical structure;
wherein the pedestal structure receives the cup structure for storage;
wherein the pedestal structure transfers the load of the cup structure and the control circuit to an externally provided object;
wherein the cup structure is a mechanical structure;
wherein the cup structure contains the fluid;
wherein the cup structure removably inserts into the pedestal structure for storage;
wherein the control circuit is an electric circuit;
wherein a portion of the control circuit mounts in the pedestal structure;
wherein the balance of the control circuit mounts in the cup structure;
wherein the control circuit: a) provides the electric energy necessary to operate the refillable drinking container; b) controls the level of the stored fluid contained in the cup structure; and, c) controls the temperature of the stored fluid contained in the cup structure;
wherein the control circuit is an independently powered electric circuit;
wherein by independently powered is meant that the control circuit can maintain the temperature of the stored fluid without an electrical connection to an external power source when the cup structure is removed from the pedestal structure.

2. The refillable drinking container according to claim 1 wherein the pedestal structure comprises a pedestal pan and a pedestal tenon;
wherein the pedestal tenon mounts on the pedestal pan;

wherein the cup structure comprises a cup pan, a cup mortise, and a cup check valve;
wherein the cup mortise is formed in the cup pan;
wherein the cup check valve mounts in the cup pan;
wherein the control circuit comprises an operating circuit and a wireless power circuit;
wherein the operating circuit and the wireless power circuit are electrically connected.

3. The refillable drinking container according to claim 2 wherein the pedestal pan has a disk shape;
wherein the pedestal pan is formed as a pan;
wherein the pedestal pan forms the load path the transfers the load of the cup structure and the control circuit to the externally provided object;
wherein the pedestal pan forms the physical structure that receives and stores the cup structure when the cup structure is not in use;
wherein the cup structure inserts into the hollow interior of the pedestal pan for storage;
wherein the pedestal pan further comprises a pedestal open face, a pedestal closed face, and a plurality of pedestal lateral faces;
wherein the pedestal open face is the open face of the pan structure of the pedestal pan;
wherein the pedestal open face is formed in a congruent end of the disk structure of the pedestal pan;
wherein the pedestal open face forms the superior surface of the pedestal pan;
wherein the pedestal closed face is the closed face of the pan structure of the pedestal pan;
wherein the pedestal closed face is formed in a congruent end of the disk structure of the pedestal pan;
wherein the pedestal closed face forms the inferior surface of the pedestal pan;
wherein the pedestal closed face is the surface of the pedestal pan that is distal from the pedestal open face;
wherein the plurality of pedestal lateral faces forms the lateral face of the disk structure of the pedestal pan;
wherein the plurality of pedestal lateral faces forms the vertically oriented containment boundaries of the hollow interior of the pedestal pan.

4. The refillable drinking container according to claim 3
wherein the pedestal tenon mounts on the interior surface of the pedestal closed face of the pedestal pan;
wherein the pedestal tenon inserts into the hollow interior of the pedestal pan;
wherein the pedestal tenon forms a tenon that inserts into the cup structure as the cup structure;
wherein the pedestal tenon properly aligns the cup structure within the pedestal pan.

5. The refillable drinking container according to claim 4
wherein the cup pan has a pan shape;
wherein the cup pan is a fluid impermeable containment structure;
wherein the cup pan contains the fluid in anticipation of the consumption of the fluid;
wherein the pan structure of the cup pan is geometrically similar to the pan structure of the pedestal pan such that the cup pan inserts into the pedestal pan for storage;
wherein the cup pan further comprises a cup open face, a cup closed face, and a plurality of cup lateral faces;
wherein the cup open face is the open face of the pan structure of the cup pan;
wherein the cup open face is formed in a congruent end of the disk structure of the cup pan;
wherein the cup open face forms the superior surface of the cup pan;
wherein the cup closed face is the closed face of the pan structure of the cup pan;
wherein the cup closed face is formed in a congruent end of the disk structure of the cup pan;
wherein the cup closed face forms the inferior surface of the cup pan;
wherein the cup closed face is the surface of the cup pan that is distal from the cup open face;
wherein the plurality of cup lateral faces forms the lateral face of the disk structure of the cup pan;
wherein the plurality of cup lateral faces forms the vertically oriented containment boundaries of the hollow interior of the cup pan.

6. The refillable drinking container according to claim 5
wherein the cup mortise is a negative space that is formed in the pedestal closed face of the pan structure of the cup pan;
wherein the cup mortise is geometrically similar to the pedestal tenon of the pedestal pan such that the pedestal tenon inserts into the cup mortise;
wherein the cup mortise is positioned on the exterior surface of the pedestal closed face such that the cup pan is properly oriented relative to the pedestal pan when the pedestal tenon inserts into the cup mortise.

7. The refillable drinking container according to claim 6
wherein the cup check valve is a check valve that installs in the pedestal closed face of the cup pan;
wherein the cup check valve forms a fluidic link between the water source and the cup structure such that the fluid only flows in one direction;
wherein the cup check valve limits the direction of the flow of the fluid from the water source into the cup pan for storage.

8. The refillable drinking container according to claim 7
wherein the operating circuit is an electric circuit;
wherein the operating circuit measures the quantity of fluid contained in the cup mortise;
wherein the operating circuit measures the temperature of the fluid contained in the cup mortise;
wherein the operating circuit pumps the fluid from the water source through the cup check valve into the cup pan;
wherein the operating circuit maintains a previously determined level of fluid within the cup pan;
wherein the operating circuit heats the fluid within the cup pan such that a minimum temperature is maintained.

9. The refillable drinking container according to claim 8
wherein the operating circuit comprises a logic module, a metered pump, and a heating element;
wherein the logic module, the metered pump, and the heating element are electrically connected;
wherein the metered pump forms a fluidic link between a water source and a water discharge;
wherein the water source is the fluid source used to replenish the fluid contained in the cup pan;
wherein the water discharge is a port that allows for the discharge of the fluid from the metered pump into the cup pan.

10. The refillable drinking container according to claim 9
wherein the logic module is an electric circuit;
wherein the logic module monitors the quantity of fluid contained in the cup mortise;
wherein the logic module monitors the temperature of the fluid contained in the cup mortise;
wherein the logic module controls the operation of the metered pump to control the volume of the fluid contained in the cup pan;

wherein the logic module controls the flow of electric energy into the heating element to control the temperature of the fluid contained in the cup pan.

11. The refillable drinking container according to claim 10 wherein the logic module further comprises a conductive sensor, a temperature sensor, a transistor, and a limit resistor;

wherein the conductive sensor, the temperature sensor, the transistor, and the limit resistor electrically connect to the logic module;

wherein the conductive sensor is a sensor;

wherein the conductive sensor generates an electric signal that is a function of the volume of fluid that is contained in the cup pan;

wherein the logic module monitors the electric signal generated by the conductive sensor;

wherein when the conductive sensor indicates that the volume of fluid has fallen below a previously determined level, the logic module initiates the operation of the metered pump;

wherein the temperature sensor is a sensor;

wherein the temperature sensor generates an electric signal that is a function of the temperature of fluid that is contained in the cup pan;

wherein the logic module monitors the electric signal generated by the temperature sensor;

wherein when the temperature sensor indicates that the temperature of fluid has fallen below a previously determined temperature the logic module initiates the operation of the heating element;

wherein the transistor is an electric switching device;

wherein the logic module controls the operation of the transistor;

wherein the transistor is electrically connected between the wireless power circuit and the metered pump such that the transistor controls the flow of electric energy into the metered pump;

wherein the limit resistor is an electrical circuit element;

wherein the limit resistor electrically connects between the logic module and the transistor;

wherein the limit resistor limits the amount of electric current that can flow from the logic module into the base of the transistor.

12. The refillable drinking container according to claim 11 wherein the metered pump is a pump that draws fluid through the cup check valve from the water source and discharges the drawn fluid through a water discharge into the cup pan;

wherein the metered pump mounts in the cup closed face of the cup pan;

wherein the logic module controls the operation of the metered pump by controlling the flow of electric energy into the metered pump;

wherein the metered pump measures the volume of fluid that is pumped into the cup pan.

13. The refillable drinking container according to claim 12 wherein the heating element is a resistive heating device;

wherein the heating element mounts in the plurality of cup lateral faces of the cup pan;

wherein the heating element generates the heat used to warm the fluid when electric energy flows through the heating element;

wherein the logic module controls the operation of the heating element by controlling the flow of electric energy into the heating element.

14. The refillable drinking container according to claim 13 wherein the wireless power circuit is an electrical circuit;

wherein the wireless power circuit powers the operation of the control circuit;

wherein the wireless power circuit is an electrochemical device;

wherein the wireless power circuit converts chemical potential energy into the electrical energy required to power the control circuit;

wherein the wireless power circuit: a) draws ac electrical energy from a national electric grid; and, b) wirelessly broadcasts the ac electrical energy received from the national electric grid to the induction circuit;

wherein the wireless power circuit comprises an energy broadcast circuit and an induction circuit;

wherein the energy broadcast circuit is an electrical circuit;

wherein the energy broadcast circuit draws ac electrical energy from the national electric grid;

wherein the energy broadcast circuit processes the ac electrical energy for broadcast;

wherein the energy broadcast circuit broadcasts the processed ac electrical energy to the induction circuit.

15. The refillable drinking container according to claim 14 wherein the energy broadcast circuit comprises a first ac/dc converter, a frequency generating circuit, a first amplifier, a broadcast antenna, and a national electric grid;

wherein the first ac/dc converter, the frequency generating circuit, the first amplifier, the broadcast antenna, and the national electric grid are electrically interconnected;

wherein the induction circuit comprises a battery, an induction antenna, a second ac/dc converter, and a voltage regulator;

wherein the battery, the induction antenna, the second ac/dc converter, and the voltage regulator are electrically interconnected.

16. The refillable drinking container according to claim 15 wherein the first ac/dc converter is an ac/dc converter;

wherein the first ac/dc converter electrically connects to the national electric grid;

wherein the first ac/dc converter receives ac electrical energy from the national electric grid and converts the ac electrical energy into a regulated dc voltage;

wherein the frequency generating circuit is an electrical circuit;

wherein the frequency generating circuit is an oscillating circuit that receives dc electrical energy from the dc regulated voltage provided by the first ac/dc converter;

wherein the frequency generating circuit generates an ac electrical voltage at the broadcast frequency of the energy broadcast circuit;

wherein the first amplifier is an electrical circuit;

wherein the first amplifier is a power amplifier;

wherein the first amplifier receives as an input the ac voltage generated by the frequency generating circuit and amplifies the received ac electrical voltage such that the signal broadcast by the energy broadcast circuit contains sufficient energy to broadcast electrical energy for use by the induction circuit;

wherein the broadcast antenna is an electrical device;

wherein the broadcast antenna receives the amplified ac electrical energy from the first amplifier and broadcasts the amplified ac electrical energy as electromagnetic radiation to the induction circuit;

wherein the national electric grid is a source of the electrical energy required to operate the wireless power circuit.

17. The refillable drinking container according to claim 16 wherein the induction circuit is an electrical circuit;
- wherein the induction circuit receives the ac electrical energy broadcast from the energy broadcast circuit and processes the received ac electrical energy into a regulated dc voltage that recharges the battery with dc electrical energy;
- wherein the induction antenna is an electrical device;
- wherein the induction antenna receives the electromagnetic radiation generated by the energy broadcast circuit and converts the received electromagnetic radiation into ac electrical energy;
- wherein the induction antenna electrically connects the received ac electrical energy to the second ac/dc converter for processing;
- wherein the second ac/dc converter is an ac/dc converter;
- wherein the second ac/dc converter electrically connects to the induction antenna;
- wherein the second ac/dc converter receives ac electrical energy from the induction antenna and converts the ac electrical energy into a source of dc electrical energy with an unregulated dc voltage;
- wherein the voltage regulator is an electrical circuit;
- wherein the voltage regulator converts the unregulated dc electrical energy received from the second ac/dc converter into a regulated dc voltage source that provides regulated dc electrical energy to the battery;
- wherein the battery is an electrochemical device;
- wherein the battery converts chemical potential energy into the electrical energy used to power the control circuit;
- wherein the diode is an electrical device that limits the flow of electricity to one direction;
- wherein the diode installs between the battery and the voltage regulator such that electricity will not back flow from the battery into the voltage regulator.

* * * * *